(12) United States Patent
Gillis et al.

(10) Patent No.: US 6,359,433 B1
(45) Date of Patent: Mar. 19, 2002

(54) METHOD AND APPARATUS FOR PREVENTING DATA LOSS IN DISK DRIVES USING PREDICTIVE FAILURE ANALYSIS OF MAGNETORESISTIVE HEAD RESISTANCE

(75) Inventors: Donald Ray Gillis, San Jose; Reinhard Ferdinand Wolter, Saratoga; Kris Victor Schouterden, Los Gatos, all of CA (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/460,651

(22) Filed: Dec. 14, 1999

(51) Int. Cl.[7] .............................................. G01R 33/12
(52) U.S. Cl. ....................................... 324/210; 324/537
(58) Field of Search ................................ 324/210, 211, 324/212, 207.21, 205, 252, 537, 549, 207.2; 360/313

(56) References Cited

U.S. PATENT DOCUMENTS

| | | | |
|---|---|---|---|
| 3,938,193 A | 2/1976 | Sargunar | 360/137 |
| 4,716,306 A | 12/1987 | Sato et al. | 307/296 R |
| 4,841,389 A | 6/1989 | Hoyt et al. | 360/75 |
| 5,410,439 A | 4/1995 | Egbert et al. | 360/75 |
| 5,512,883 A | 4/1996 | Lane, Jr. | 340/648 |
| 5,539,592 A | 7/1996 | Banks et al. | 360/75 |
| 5,696,445 A | 12/1997 | Inbar | 324/228 |
| 5,805,664 A | * 9/1998 | Whipple, III et al. | 378/117 |
| 5,854,554 A | * 12/1998 | Tomita et al. | 324/210 |
| 5,864,241 A | 1/1999 | Schreck et al. | 324/699 |
| 5,982,568 A | * 11/1999 | Yamamoto | 360/31 |

* cited by examiner

Primary Examiner—Jay Patidar
Assistant Examiner—Reena Aurora
(74) Attorney, Agent, or Firm—Altera Law Group

(57) ABSTRACT

A method and apparatus for providing predictive failure analysis using the resistance of a sensor such as a MR, GMR, spin valve or wear sensor. A baseline measurement of resistance for at least one sensor of a disk drive is obtained, subsequent measurements of resistance for the at least one sensor of a disk drive are periodically obtained and the subsequent measurements and the baseline measurement to identify a detrimental change to the at least one sensor are processed. The processing further includes comparing a subsequent resistance measurement for the at least one sensor to the baseline measurement of resistance for the at least one sensor to detect a head/disk interface problem and flagging the file for corrective action when the head/disk interface problem is detected. Alternatively, the processing further includes determining a change in stripe height based upon the difference between the baseline measurement of resistance and the subsequent measurement of resistance.

45 Claims, 10 Drawing Sheets

METHOD AND APPARATUS FOR PREVENTING DATA LOSS IN DISK DRIVES USING PREDICTIVE FAILURE ANALYSIS OF MAGNETORESISTIVE HEAD RESISTANCE

BACKGROUND OF THE INVENTION

1. Field of the Invention

This invention relates in general to disk drive reliability, and more particularly to a method and apparatus for providing predictive failure analysis using the MR head resistance.

2. Description of Related Art

Most companies today are concerned about system availability of their local area networks. With mission-critical applications now commonplace on PC servers, companies cannot afford to incur unplanned outages. Further, computer users today have great expectations of data storage reliability. Many users do not even consider the possibility of losing data due to a hard disk drive failure. Even though continual improvements in technology make data loss uncommon, it is not impossible. Computer system failures on the whole are aggravating. Production is delayed, customers upset, users dismayed, and in general, nothing can be accomplished until the system is operational, and data restored. Even though disk drive reliability has been constantly improving, failures still occur.

Because of the consequences of losing data, disk drive reliability is very important. Reliability has been measured in the industry with Mean Time Between Failure (MTBF), a term or claim that is easy to advertise (a higher number is better), difficult to explain, and nearly impossible to prove or guarantee. Unlike other hard disk drive performance parameters, reliability cannot be measured until after there has been field experience with the product. Analysis of actual failures is needed for accurate numbers.

Historically, there are four ways to manage hardware maintenance. First, hardware maintenance can be managed by doing nothing until something fails. Then the defective part can be replaced. This is cost-effective if unplanned down time, lost data, and all of the other unpleasantness of a disk drive failure is acceptable.

Alternatively, preventive maintenance can be practiced. This method requires the replacement of all parts that typically fail, before they fail. This is somewhat effective in reducing unscheduled down time (parts do not always fail on schedule), but has a high cost in replacing parts that would not have failed.

The third alternative is to use redundancy. In this method, if one disk drive is needed, two or more are used, with one for primary and one or more are used as a mirrored backup. Redundant Array of Independent Disks (RAID) is another example of redundancy. Redundancy has additional expense because of the extra hardware and software requirement, and may lower the performance of the system.

Finally, there is a fourth maintenance solution. Condition monitoring may be used to provide predictive failure analysis (PFA). PFA condition monitoring is an improved method that can provide early warning of impending failure, and allow scheduled replacement of the failing device.

As with any electrical/mechanical device, there are two basic failure types. First, there is the on/off type of failure, e.g., a cable breaks, a component burns out, a solder connection fails. These are all examples of unpredictable catastrophic failures. As assembly and component processes have improved, these types of defects have been reduced but not eliminated. PFA cannot provide warning for on/off unpredictable failures.

The second type of failure is the gradual performance degradation of components. PFA has been developed to monitor performance of the disk drive, analyze data from periodic internal measurements, and recommend replacement when specific thresholds are exceeded. The thresholds have been determined by examining the history logs of disk drives that have failed in simulated customer operation.

Typically, predictive failure analysis in disk drives involves the measurement of several attributes, including head flying height, to predict failures. The disk drive, upon sensing degradation of an attribute, such as flying height, sends a notice to the host that a failure may occur. Upon receiving notice, users can take steps to protect their data.

PFA is an attractive solution to disk drive maintenance. PFA minimizes exposure to data loss, and at a much lower cost than redundancy. PFA only calls for preventive replacement of a disk drive when that drive's performance is degraded. Accordingly, PFA provides a new level of data protection and allow for scheduled replacement of the drive.

PFA may monitor performance in two ways. PFA may be a measurement driven process or a symptom driven process. The measurement driven process automatically performs a suite of self-diagnostic tests which measure changes in the disk drive's component characteristics. Various magnetic parameters of the head and disk are measured, as well as figures of merit for the channel electronics. Head fly height on all data surfaces, channel noise, signal coherence, signal amplitude, and writing parameters may also be monitored. Unlike conventional error monitors, this method provides for direct detection of specific mechanisms that can precede a disk drive failure.

The measurement of the current driving the spindle motor has also been used to detect changes in the health of the drive. For example, an increase in the current required to drive the spindle motor may indicate drag at one or more head/disk interfaces.

However, because of the subtleties involved at the head/disk interface, further details of the head/disk interface provided by magnetoresistive (MR) head resistance monitoring have not been previously used in the predictive failure analysis. Yet qualitative and quantitative monitoring of the head/disk interface would provide an indicator of system performance over time and could identify specific mechanisms that can precede a disk drive failure. Further, the qualitative and quantitative monitoring of the head/disk interface is applicable to contact recording, where identification of wear at the head-disk interface is important.

It can be seen then that there is a need for a method and apparatus that provides qualitative and/or quantitative monitoring of the head/disk interface during normal file operations.

It can also be seen that there is a need for a method and apparatus that quantifies magnetic head wear.

SUMMARY OF THE INVENTION

To overcome the limitations in the prior art described above, and to overcome other limitations that will become apparent upon reading and understanding the present specification, the present invention discloses a method and apparatus for providing predictive failure analysis using the resistance or a sensor.

The present invention solves the above-described problems by correlating the resistance of the sensor with the stripe height in the sensor to provide a quantitative measurement of the sensor wear.

A method and apparatus in accordance with the principles of the present invention obtains a baseline measurement of resistance for at least one sensor of a disk drive, periodically obtains subsequent measurements of resistance for the at least one sensor of a disk drive and processes the subsequent measurements and the baseline measurement to identify a detrimental change to the at least one sensor.

Other embodiments of a method and apparatus in accordance with the principles of the invention may include alternative or optional additional aspects. One such aspect of the present invention is that the processing further includes comparing a subsequent resistance measurement for the at least one sensor to the baseline measurement of resistance for the at least one sensor to detect a head/disk interface problem and flagging the file for corrective action when the head/disk interface problem is detected.

Another aspect of the present invention is that the processing further includes determining a change in stripe height based upon the difference between the baseline measurement of resistance and the subsequent measurement of resistance.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for providing predictive failure analysis using the resistance of the sensor. The stripe height in the sensor is correlated with the resistance to corroborate detrimental changes in the health of the disk drive. In files with a load/unload mechanism or conventional contact start/stop, the measure of the sensor resistance can also be used to calculate the wear volume. This will provide a quantitative measurement of the head wear.

Figure 1:
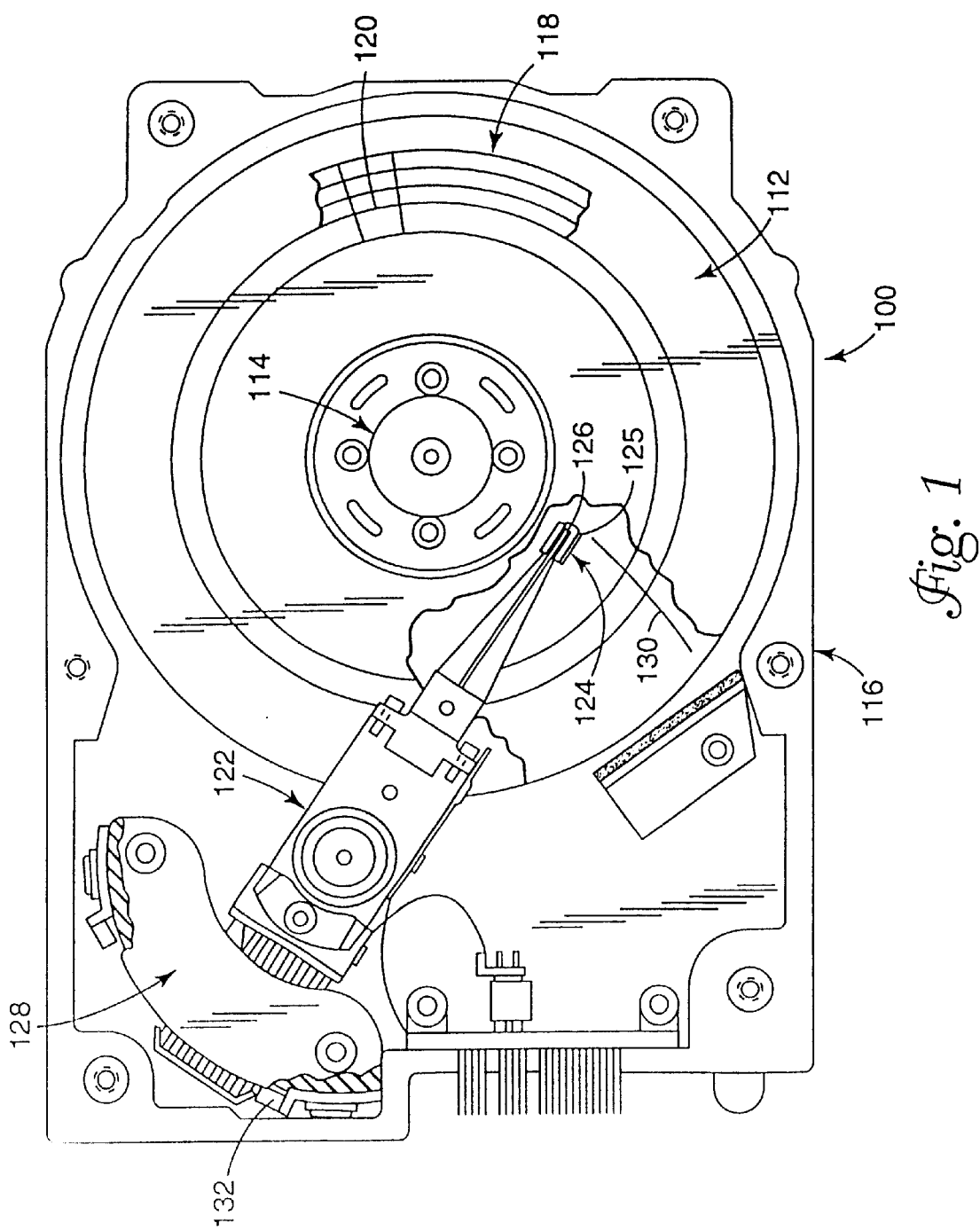
FIG. 1 illustrates a rotary magnetic disk drive system suitable for incorporating the teachings of the present invention.

FIG. 1 illustrates a rotary magnetic disk drive system 100 suitable for incorporating the teachings of the present invention. In FIG. 1, a plurality of magnetic information storage disks 112 are journaled about a spindle motor assembly 114 within a housing 116. Each magnetic disk 112 has a multiplicity of concentric circular recording tracks 118, which are subdivided into sectors 120. Data can be stored on or retrieved from the disks 112 by referencing a specific track 118 and sector 120.

An actuator arm assembly 122 is rotatably mounted preferably in one corner of the housing 116. The actuator arm assembly 122 carries a plurality of head gimbal assemblies 124. Each of the head gimbal assemblies 124 carry a slider 125 having a read/write head, or transducer 126 for reading information from and writing information onto the magnetic disks 112. Transducer 126 may, for example, include a thin film head, an MR head, a giant magnetoresistive (GMR) head, a spin valve sensor or a wear sensor. However, an MR sensor will be used hereafter to illustrate the principles of the invention.

A voice coil motor 128 is adapted to precisely rotate the actuator arm assembly 122 back and forth such that the transducers 126 move across the magnetic disks 112 along an arc 130. The disk drive system 100 also includes control circuitry 132 for processing information to be written to or received from the disks 112 and controlling the position of the transducers 126.

Figure 2:
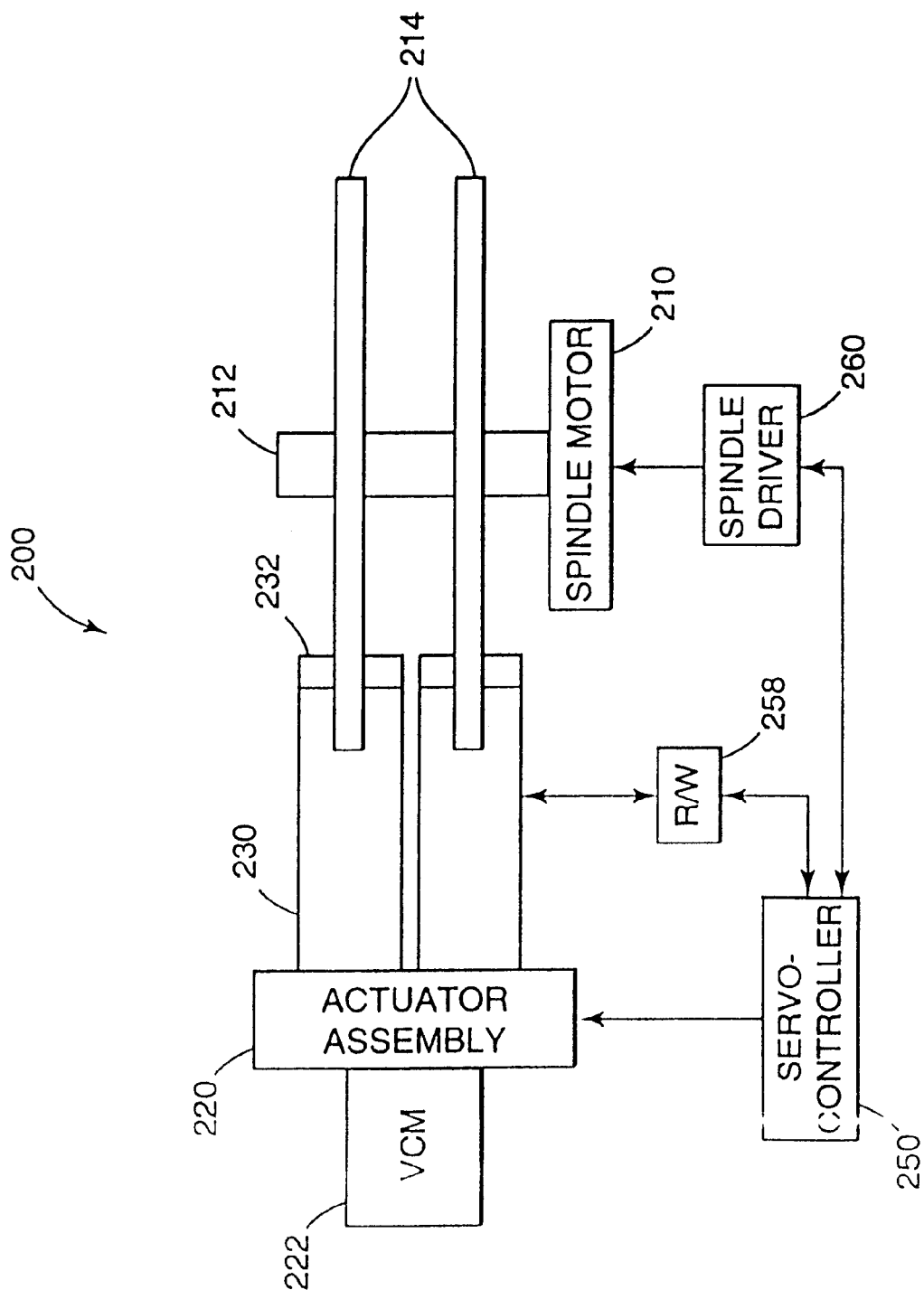
FIG. 2 illustrates a block diagram of a disk drive suitable for incorporating the teachings of the present invention.

FIG. 2 illustrates a block diagram of a disk drive 200 suitable for incorporating the teachings of the present invention. In FIG. 2, a spindle motor includes a spindle 212 having two disks 214 attached thereto. An actuator assembly 220 carries a plurality of head gimbal assemblies 230 including a read/write head, or transducer 232 for reading information from and writing information onto the magnetic disks 214. A voice coil motor 222 is adapted to precisely rotate the actuator assembly 220 back and forth such that the transducers 232 move across the magnetic disks 214 along an arc as illustrated in FIG. 1.

A servo controller 250 controls the voice coil motor to move the actuator assembly 220 to accurately position the transducers 232 at a desired position on the disks 214. A spindle driver 260 controls the spindle motor 210 to rotate the disks 214. The servo controller 250 also processes signals to and from the read/write amplifier 258. The read/write amplifier 258 properly conditions the read/write signals to ensure the desired magnetic transition pattern is written onto the disks 214. Finally, the spindle driver 260 may be under the control of the servo controller 250, which also processes signals from the spindle driver 260. Thus, the servo controller 250 processes signals from the transducers 232 and the spindle driver 260. However, those skilled in the art will recognize that while FIG. 2 illustrates that the servo controller 250 performs all of the functions described above, the present invention is not meant to be limited as such. For example, a separate processor may perform the processing of the signals from the transducers 232 and the spindle driver 260, while the servo controller 250 processes signals from the transducers 232 and controls the operation of the actuator assembly 220 via the voice coil motor 222.

In files with a load/unload mechanism or conventional contact start/stop, the measure of the MR resistance can be used to calculate the wear volume. The MR-stripe height in the read head is correlated with the head resistance. This will provide a quantitative measurement of the head wear. In fact, MR-stripe height in the read head is correlated with the head resistance to detect changes in the MR stripe height as small as one nanometer.

The normal read/write operations in the file will not reflect the head wear because it is essentially measuring the high frequency component of the readback signal, i.e., the read/write performance does not deteriorate during the initial wearing of the head. The recognition of subtle changes in the head/disk interface while the file is still 100% functional provides a substantial advantage, because of the predictive nature of the interface changes, and because data backup or transfer to an independent data storage device can be initiated and completed before an actual failure occurs.

Figure 3:
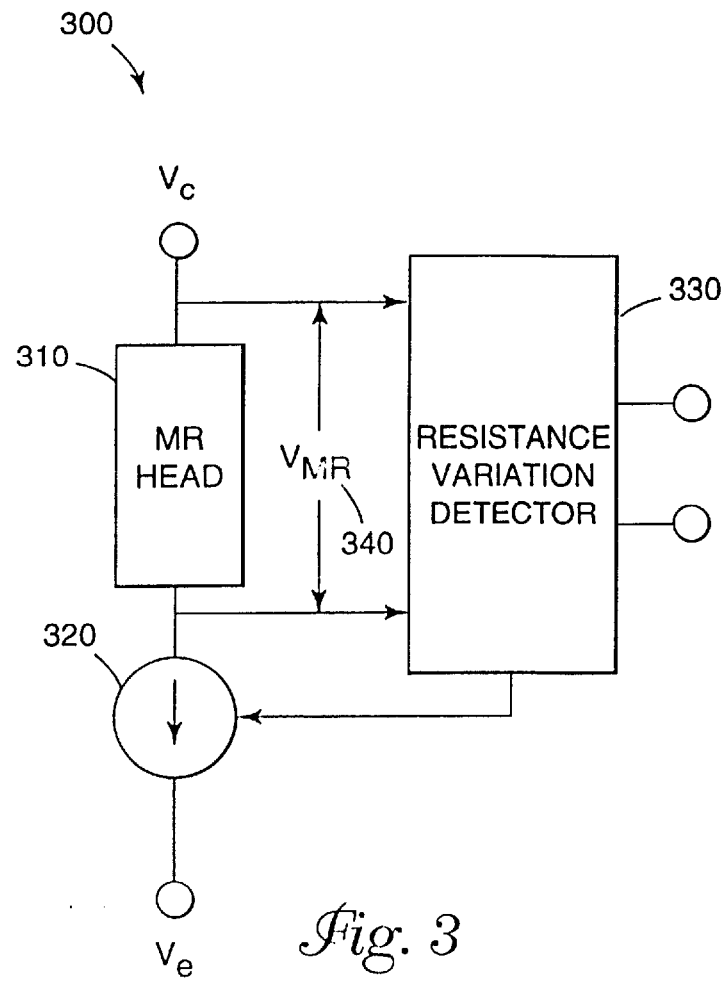
FIG. 3 illustrates a block diagram of a sensor for detecting changes in resistance of the MR head according to the present invention.

FIG. 3 illustrates a block diagram of a sensor 300 for detecting changes in resistance of the MR head according to the present invention. FIG. 3 illustrates a MR head 310 and a sense current source 320. The MR head 310 is supplied with a current by the sense current source 320. The resistance variation detector 330 monitors the resistance of the MR head 310 and controls the sense current source 320 providing the current flowing through the MR head 310. Thus, the resistance variation detector 330 can quantify the resistance of the MR head 310, which is equal to the voltage, $V_{MR}$ 340, across the MR head 310 divided by the current flowing therein.

Those skilled in the art will recognize that the present invention is not meant to be limited to the particular MR head resistance sensor 300 illustrated in FIG. 3, but that other variants are possible consistent with the teachings of the present invention. Moreover, the present invention may be applied to GMR heads and spin valve sensors as well.

Figure 4:
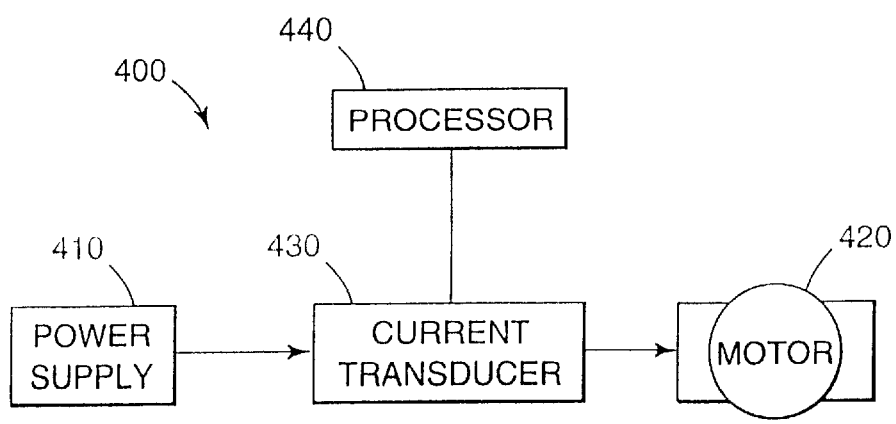
FIG. 4 illustrates a block diagram of a spindle motor current sensor according to the present invention.

FIG. 4 illustrates a block diagram of a spindle motor current sensor 400 according to the present invention. In FIG. 4, a power supply provides current to drive the spindle motor 420. A current transducer 430 is disposed between the power supply 410 and the spindle motor 420 to detect the current being provided to the spindle motor 420. The current level parameter is provided to the processor 440 for processing. The processor 440 can then use the detected current level to corroborate MR head resistance sensor changes that are detected using the MR resistance sensor 300 of FIG. 3.

Figure 5:
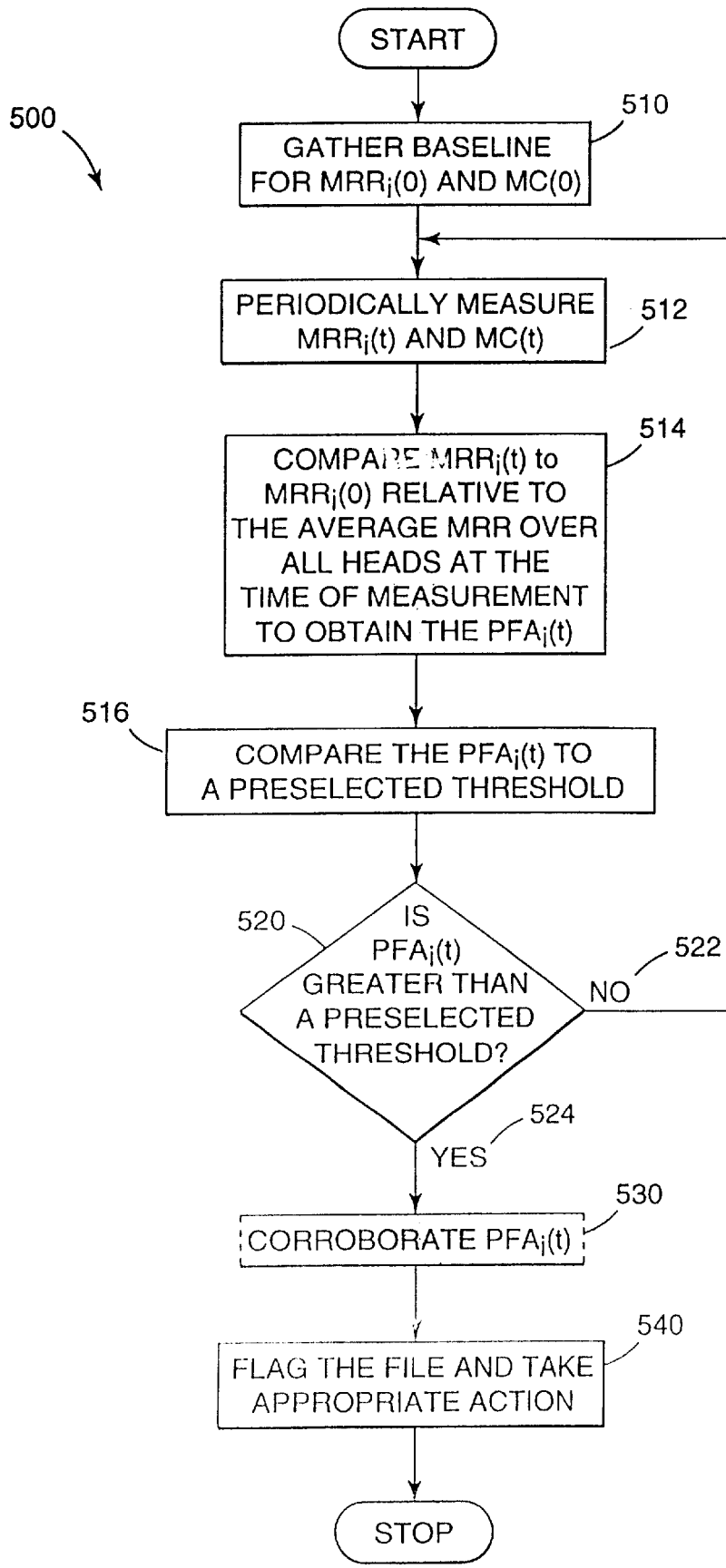
FIG. 5 illustrates a flow chart of the method for providing predictive failure analysis of a disk drive according to the present invention.

FIG. 5 illustrates a flow chart 500 of the method for providing predictive failure analysis of a disk drive according to the present invention. In FIG. 5, qualitative monitoring of the head disk interface during normal file operation and corroborating data gathering are used to provide predictive failure analysis of the disk drive. First, a baseline sensor resistance and motor current signature, $MRR_i(0)$ and $MC(0)$, of a hard disk drive is measured at the beginning of life 510.

This is preferably done at a controlled temperature, i.e. normal operating temperature, or any repeatable internal temperature or temperature compensation can be applied if an independent temperature sensor is available. If a load/unload mechanism is present, the measurement is preferably taken while the heads are unloaded and the disks are either spinning at constant speed or stationary. If no load/unload mechanism is present, the MRR measurement should be taken with the heads positioned at a constant radius and the disks spinning at constant velocity.

Periodically, the sensor resistance and motor current signature, $MRR_i(t)$ and $MC(t)$, of the hard disk drive are measured 512. The exact condition of the file for this measurement is not critical, however the MRR should be measured for all heads under the same condition. A good example for a measurement condition is, for example, while track following at any specific disk radius.

Next, the current MRR for each head is compared with its initial MRR, relative to the average MRR over all heads at the time of the measurement 514. Mathematically this can be expressed through the following formula:

$$PFA_i(t) = \frac{MRR_i(t)}{\sum MRR_i(t)} - \frac{MRR_i(0)}{\sum MRR_i(0)}$$

$MRR_i(t)$ is the resistance for head #i measured at time t. $PFA_i(t)$ is essentially independent of the status of the file, i.e., PFA is independent of the file-base temperature, the humidity, the position of the heads, disk velocity. This is especially helpful since the MRR for each individual effect is directly influenced by these factors.

Next, the $PFA_i(t)$ is compared with a pre-selected threshold 516 to identify a detrimental change to a sensor. A determination is made as to whether the $PFA_i(t)$ violates the pre-selected threshold 520. If the PFA threshold is not violated 522, the file continues to measure $MRR_i(t)$ and $MC(t)$ 512. If the PFA threshold is violated 524, then the file is flagged and a decision is made concerning data transfer to an independent storage device 540.

The PFA may be corroborated 530 by measuring or monitoring other file-parameters. For example, the power consumption during normal file operation can be monitored to detect that the spindle current for the file of interest (file with head wear) increases unexpectedly when the MRR for head 6 starts to climb. This can be directly related to increase drag in one or more head disk interfaces. However, those skilled in the art will recognize that head resistance monitoring may be used with one or a combination of additional detection methods, e.g. measuring the motor current, to corroborate any notable or significant change in the head/disk interface.

Figure 6:
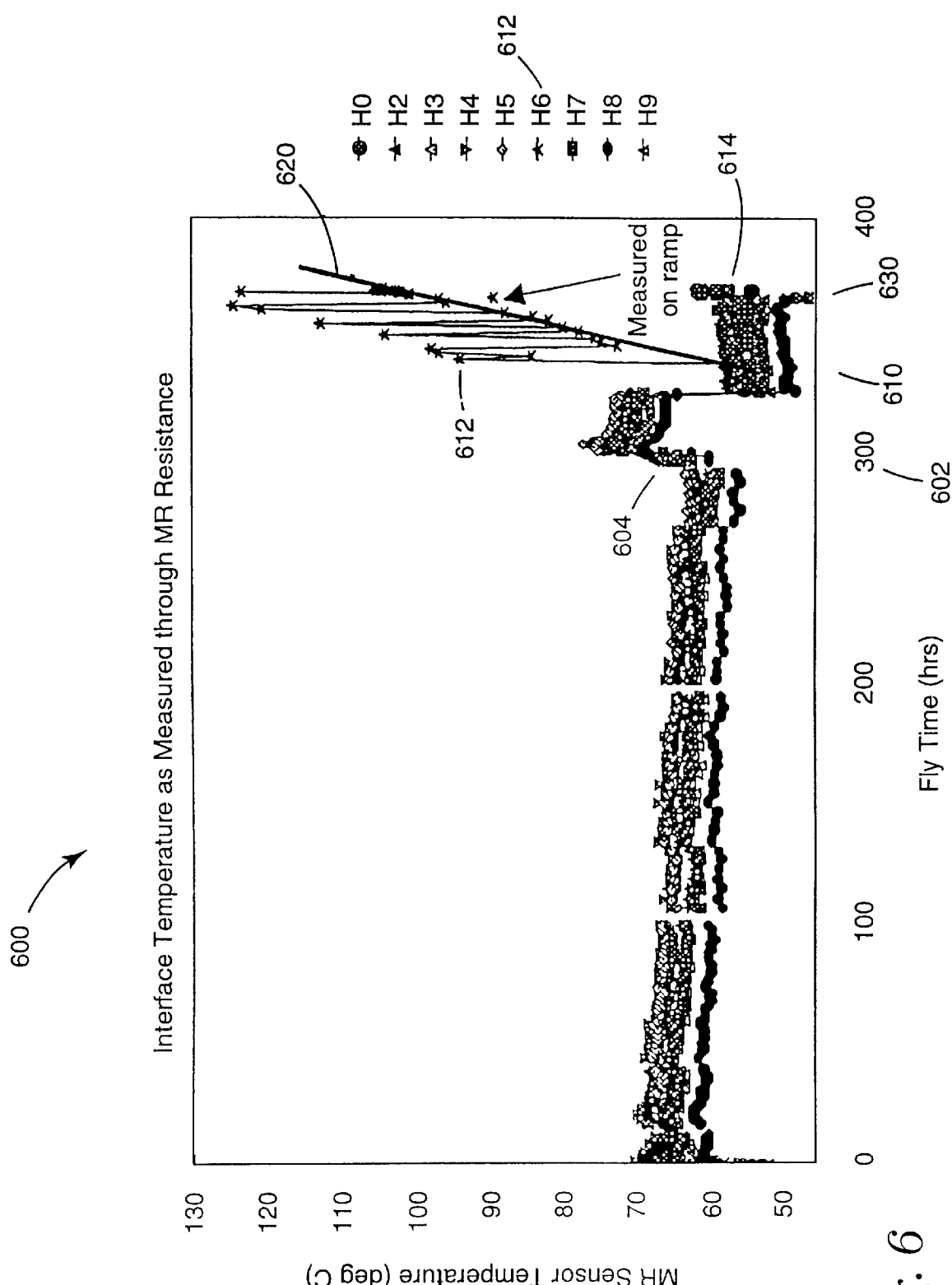
FIG. 6 illustrates a plot of MR sensor temperature over time.

More detailed MRR measurements yield important additional interface insights as well. FIG. 6 illustrates a plot of MR sensor temperature over time 600. In FIG. 6, after about 300 hours 602 all heads simultaneously react to a general file change 604. Since all heads react similarly, it is unlikely that this event indicates a problem with the head disk interface. After 340 hours 610, the MRR for head 6 612 starts to deviate significantly from the other heads 614, this is the onset of a head/disk interface related problem. The increase is bimodal and can be explained by intermittent contact of the head with the disk. Thermal spikes are generated by frictional heating during these contacts (of short duration). When intermittent contacts occur during the MRR measurement, a higher temperature is recorded (points above line 620); when no intermittent contacts occur during the measurement the lower temperature is recorded. However, these early stage indications may not be confirmed during tear down by HDD crashes.

During these contacts, the MR element is slowly polished away. The polishing action causes the MR resistance to increase (smaller MR volume results in greater MR resistance), which translates into an apparent temperature increase of the head along the line 620 in FIG. 6. The MRR/temperature measurement on the ramp at 367 hours 630 shows that the MRR for head 6 (612) changed by about 1.5% from its original value while the other sliders show no change. This MRR change corresponds to a MR-stripe height reduction of 10 nm, i.e., 10 nm of the read head has been removed by the polishing action of the head disk interface during the intermittent contact.

Figure 7:
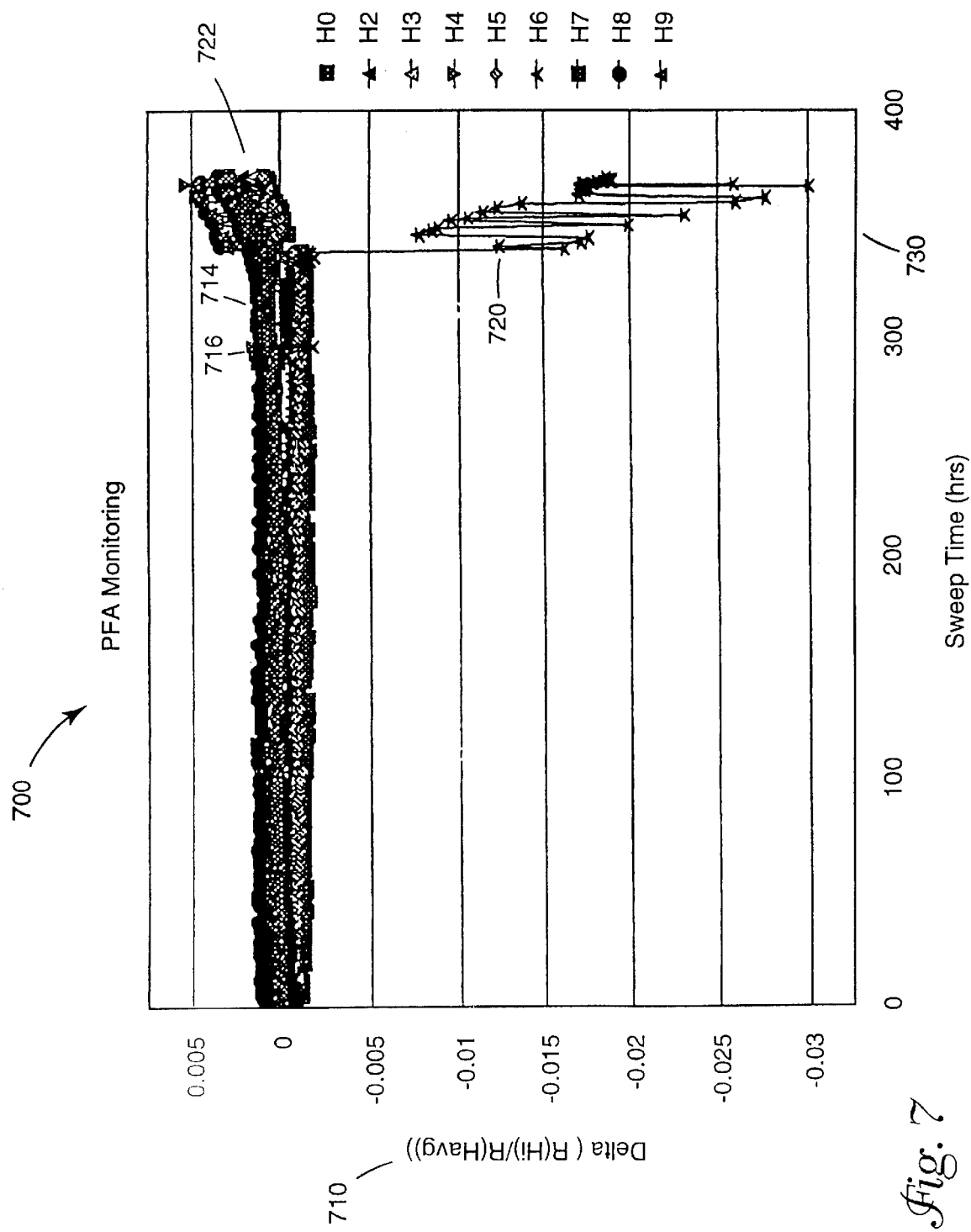
FIG. 7 shows the plot of the PFA for individual heads according to the present invention.

FIG. 7 shows the plot 700 of the PFA 710 for individual heads according to the present invention. The PFA region after 300 hours 716 is not affected by the general change in the file condition 604, which was shown in FIG. 6. The deviation 720 of head 6 from the rest 722 is immediately detected after 340 hours 730.

Figure 8:
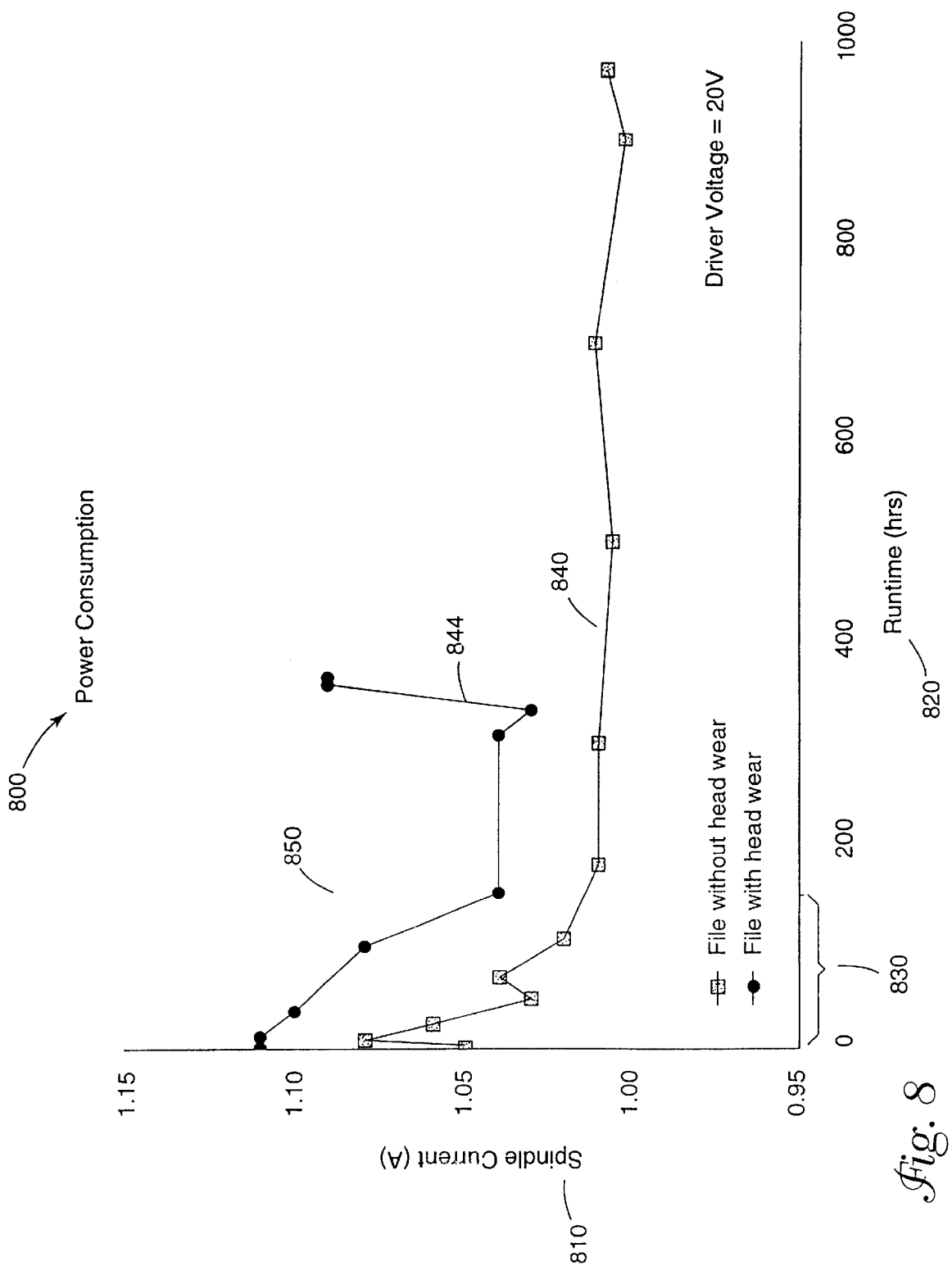
FIG. 8 shows a plot of the spindle motor current measured during different file operations.

FIG. 8 shows a plot 800 of the spindle motor current 810 measured during different file operations 820. During the first 150–200 hours 830, interface burnishing takes place. After this period, the spindle current varies little under normal circumstances, which is illustrated by the plot of the file without head wear 840. However, abrupt changes 844 in the spindle current occur for the file with head wear 850. Note that these changes occur after 340 hours, which corresponds to the notable MRR changes forehead 6 illustrated in FIG. 6. Accordingly, the power consumption during normal file operation can be monitored to detect that the spindle current for the file of interest (file with head wear) increases unexpectedly when the MRR for head 6 starts to climb. This can be directly related to increased drag in one or more head disk interfaces.

Figure 9:
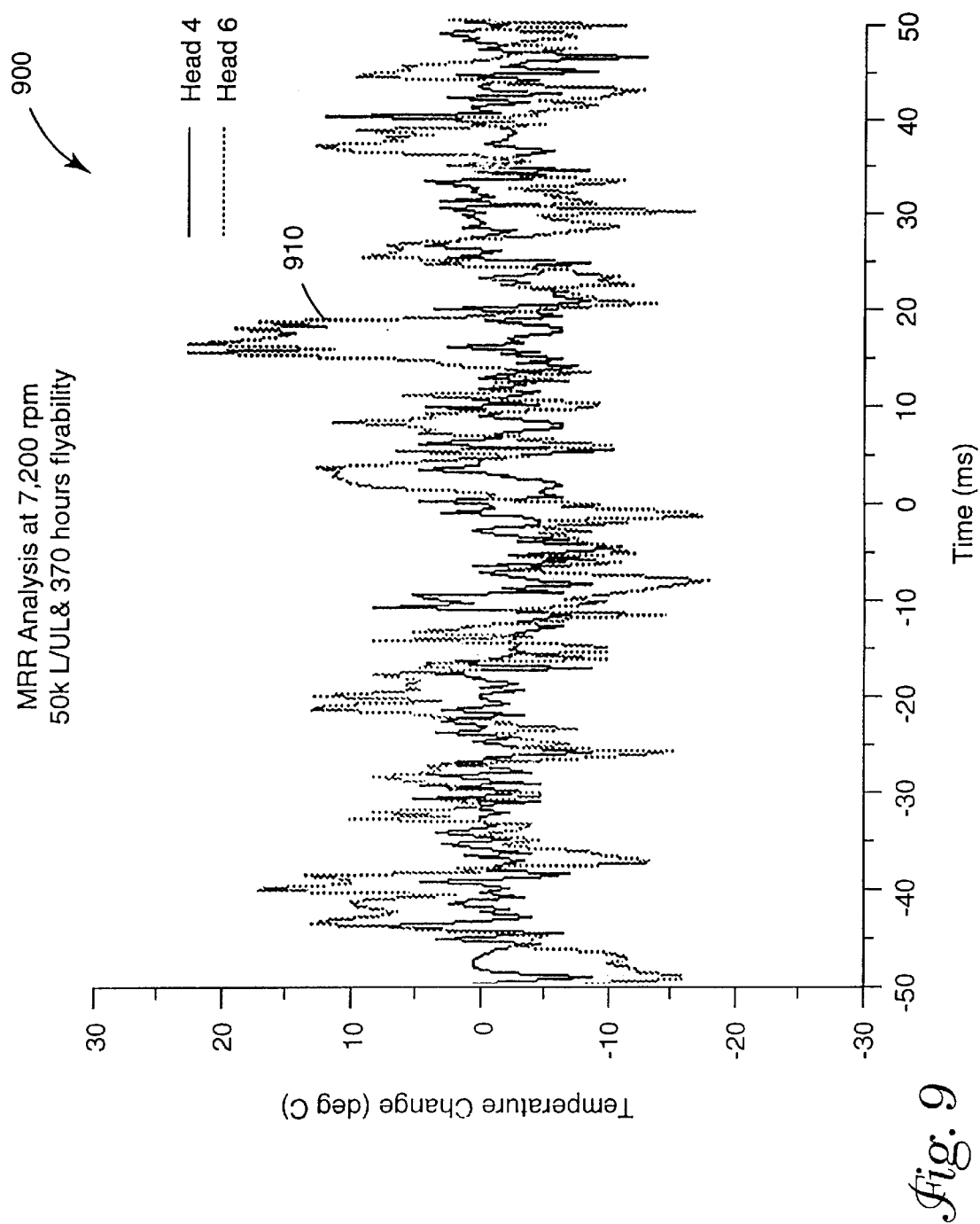
FIG. 9 shows a plot of the temperature change over time for heads 4 and 6.

FIG. 9 shows a plot of the temperature change over time for heads 4 and 6. In FIG. 9, head 6 shows large fluctuations 910, consistent with intermittent contact. Thus, FIG. 9 corroborates that the slider is in intermittent contact. Clearly, head 6 shows much stronger fluctuations 910 for short times than head 4. These temperature fluctuations are expected when a slider is in intermittent contact with the disk. At higher rpm, the frequency of intermittent contact decreases.

Quantitative MR resistance-measurements and motor current can be instrumental in monitoring and controlling the desired head burnishing or "Wear-in" that may be needed as the mechanical spacing in hard disk drives decreases. These MR sensor changes can be monitored in the factory under stress conditions to make sure a file starts out in good condition. This same reading taken over the operational life of the file will serve as a long term health monitor.

The present invention therefore allows a qualitative and/or qualitative monitoring of the head disk interface during normal file operation. Further, in a drive equipped with a sensor, such as an MR, GMR, spin valve or special wear sensor, magnetic (mechanical/electrical) head wear (material removal) can be quantified.

As mentioned, the head/disk interface is monitored during normal file operation. Trends have been documented so that the interaction between the head and the disk can be defined. Continued interaction can be measured as a change in DC MR resistance. Intermittent interaction is also observed through the change in resistance due to friction induced temperature variation. For the MR sensor the temperature change is due to proximity change or frictional heating when there is contact between the head and the disk.

For head wear quantification, the measured MR resistance can be used to calculate the wear volume in files with a load/unload mechanism or conventional contact start/stop. The MR-stripe height in the read head is correlated with the head resistance. This gives a quantitative measure of the head wear. Tests according to the present invention have shown sensitivity to changes as little as 1 nm.

It is important to note that the normal read/write operations in the file will not reflect the head wear because it is essentially measuring the high frequency component of the readback signal, i.e., the read/write performance does not deteriorate during the initial wearing of the head. The recognition of subtle changes in the head/disk interface while the file is still 100% functional is a substantial advantage, because it is an effective prediction of interface changes, and it allows for data backup or transfer to an independent data storage device before failure.

Figure 10:
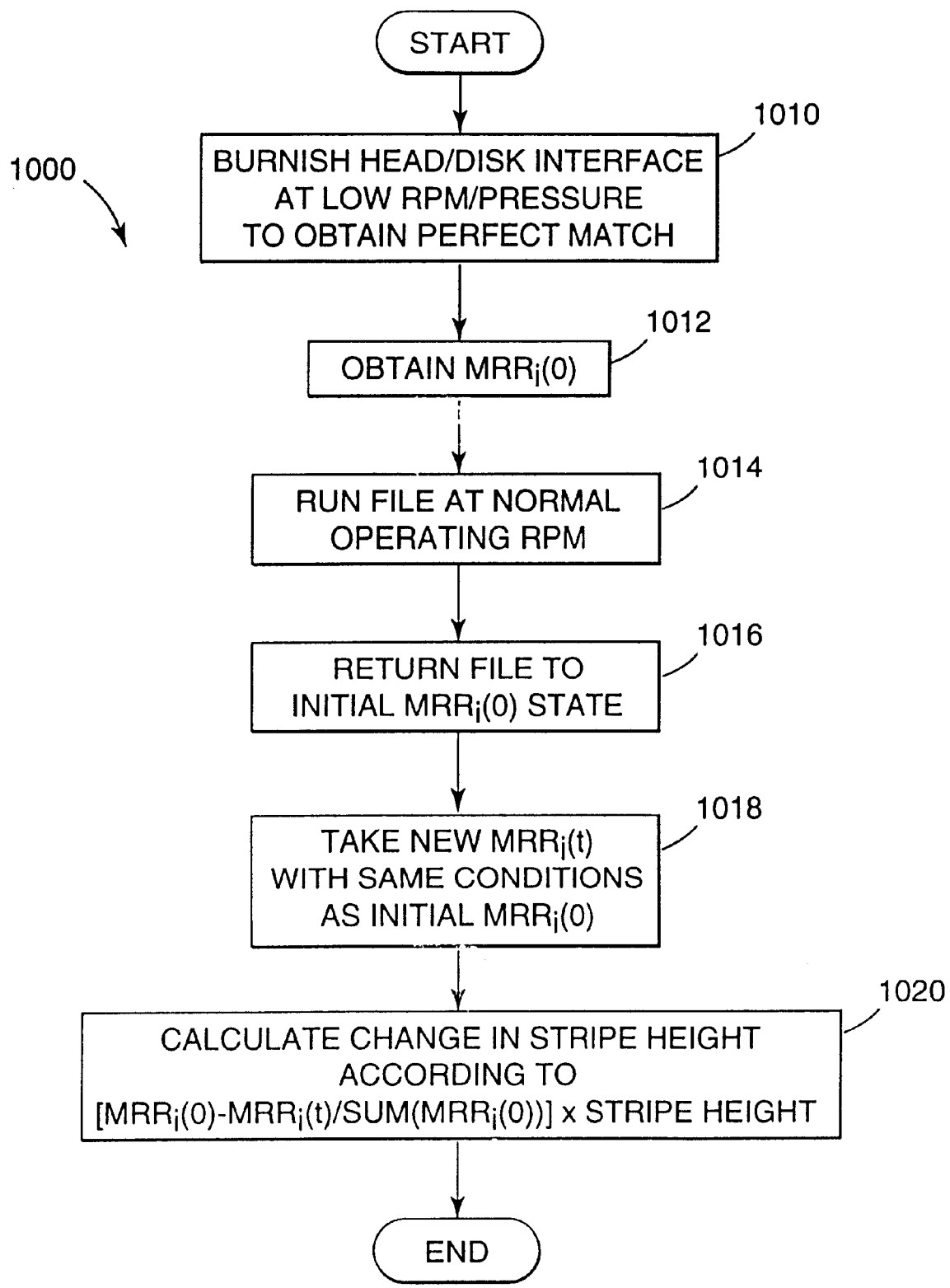
FIG. 10 illustrates a flow chart of the method for determining the change in stripe height.

In another embodiment of the present invention, monitoring the MR sensor resistance may be used for quantification of the Head Wear (Burnish Process Control). FIG. 10 illustrates a flow chart 1000 of the method for determining the change in stripe height. The in-situ head wear measurement can monitor and control an intentional burnishing process.

The head/disk interface is burnished at low RPM or low pressure to obtain a perfect match 1010. A baseline sensor resistance is obtained 1012. Then, the file is run at normal operating speed or pressure 1014.

Head wear can be quantified by returning the file to the initial MRR measurement state 1016, and a new MRR measurement $MRR_i(1)$) can be taken 1018. The relative change between the initial and the current MRR measurements, is generated by the relative change in MR-stripe height, if the conditions for the initial and the current MRR measurements are equal (e.g., temperature, disk velocity). The wear on the magnetic elements 1020 can be quantified as the change in MR-stripe height according to:

$$\Delta(StripeHeight)_i = \frac{MRR_i(t) - MRR_i(0)}{MRR_i(0)} \cdot StripeHeight$$

For each file model or version an assessment needs to be made on how much wear can be allowed before the wear to the head becomes detrimental to the operation of the disk drive. In FIG. 6, the MRR for head #6 612 increases significantly after 340 hours 610 of flying. The relative MRR change from the initial measurement is 1.5%. With a stripe height of 700 nm, this translates into a change in stripe height 10.5 nm. Hence, the slider at the magnetic elements has worn off over a height of 10 nm.

Figure 11:
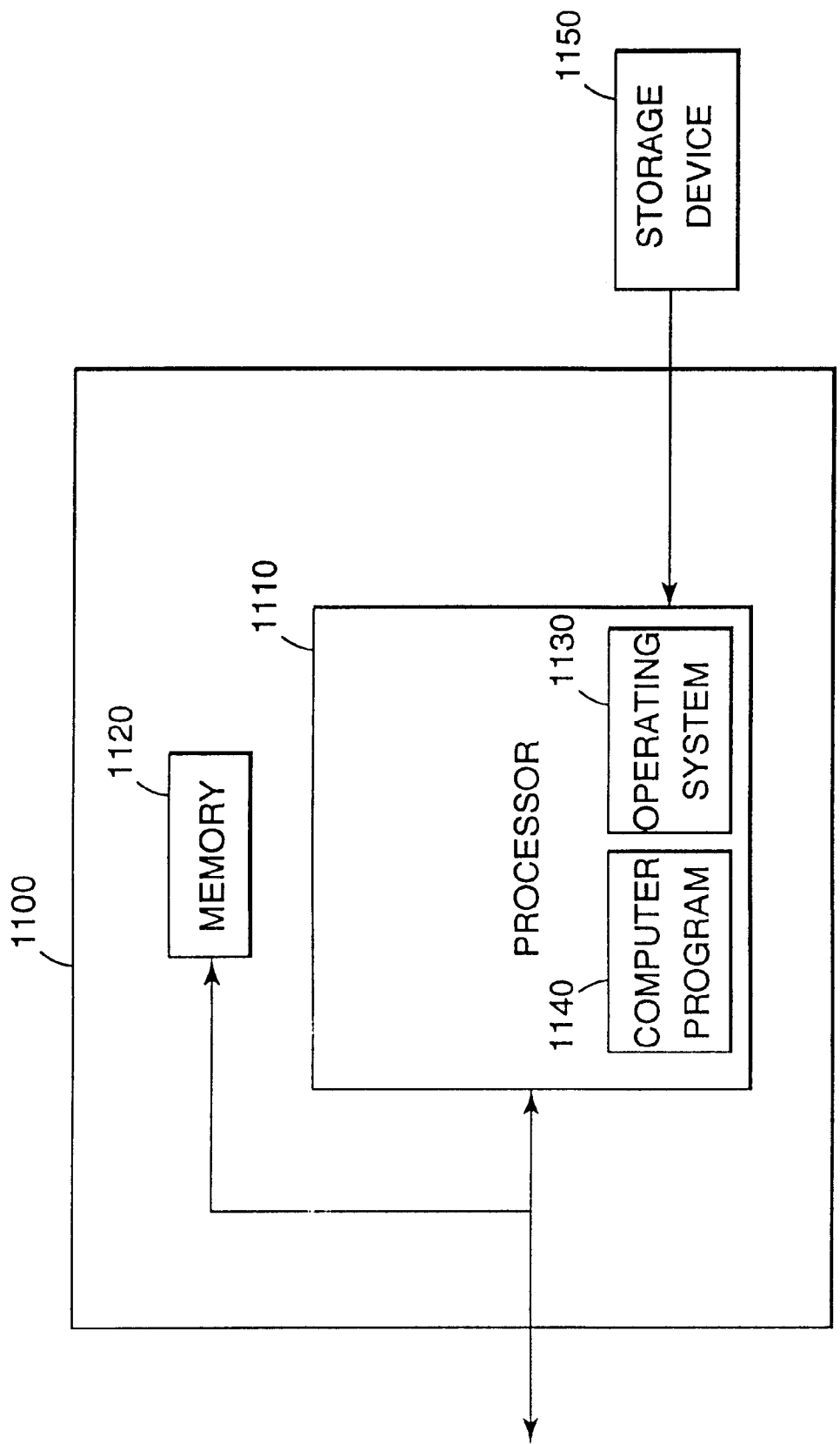
FIG. 11 is a block diagram of an exemplary hardware environment for providing predictive failure analysis using the MR head resistance according to the present invention

FIG. 11 is a block diagram 1100 of an exemplary hardware environment for providing predictive failure analysis using the MR head resistance according to the present invention. The present invention is typically implemented using a computer 1110 comprised of a microprocessor. Memory 1120 is provided for storing data for providing predictive failure analysis using the MR head. The computer 1 110 operates under the control of an operating system 1130. The computer 1110 executes one or more computer programs 1140, under the control of the operating system 1130.

Generally, the operating system 1130 and the computer programs 1140 may be tangibly embodied in a computer-readable medium or carrier, e.g. one or more of the fixed and/or removable data storage device 1150, or other data storage or data communications devices. Both the operating system 1130 and the computer programs 1140 may be loaded from the data storage device 1150 into the computer 1110 for execution as discussed above with reference to FIGS. 5 and 10. Both the operating system 1130 and the computer programs 1140 comprise instructions which, when read and executed by the microprocessor of the computer 1110, causes the computer 1110 to perform the steps necessary to execute the steps or elements of the present invention.

Although an exemplary computer system configuration is illustrated in FIG. 11, those skilled in the art will recognize that any number of different configurations performing similar functions may be used in accordance with the present invention.

Those skilled in the art will recognize that the present invention is not meant to be limited to applications with MR heads, but that the present invention may be applied to GMR heads, spin valve sensors and wear sensors as well. Resistance change without current change indicates the sensor is experiencing corrosion. This would be of interest throughout the life of the file, but could be very important to make sure a file is still good after an extended storage. Further, this information could also be used for failure analysis, if a file is returned from the field. Radial and circumferential information can also be utilized in the same fashion as pointed out above.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing predictive failure analysis for a disk drive, comprising:
   - obtaining a baseline measurement of resistance for at least one read sensor of a disk drive;
   - obtaining a present resistance measurement for the at least one read sensor;
   - comparing the present resistance measurement for the at least one read sensor to the baseline measurement of resistance for the at least one read sensor to detect a head/disk interface problem; and
   - flagging the file for corrective action when the head/disk interface problem is detected.

2. The method of claim 1 wherein the obtaining and comparing are repeated until a head/disk interface problem is detected.

3. The method of claim 1 wherein no action is taken and an additional present measurement of the resistance for the at least one read sensor is obtained when a head/disk interface problem is not detected.

4. The method of claim 1 wherein the comparing further comprises:
   - determining a predictive failure analysis value based upon a difference between the present resistance measurement for the at least one read sensor to the baseline measurement of resistance for the at least one read sensor;
   - comparing the predictive failure analysis value to a pre-selected threshold; and
   - detecting a head/disk interface problem when the predictive failure analysis exceeds the pre-selected threshold.

5. The method of claim 4 wherein no action is taken and an additional present measurement of the resistance for the at least one sensor is obtained when a head/disk interface problem is not detected.

6. The method of claim 4 further comprising correlating a detected head/disk interface problem using the resistance measurement for the at least one read sensor with at least one other file parameter to corroborate a detected head/disk interface problem.

7. The method of claim 6 wherein the at least one other file parameter comprises a measurement of the spindle motor current.

8. The method of claim 7 wherein the measurement of the spindle motor current is performed periodically to produce a current histogram to determine whether a change in the spindle motor current correlates with a change in the resistance of the at least one read sensor.

9. The method of claim 7 wherein the predictive failure analysis value is determined according to:

$$PFA_i(t) = \frac{MRR_i(t)}{\Sigma MRR_i(t)} - \frac{MRR_i(0)}{\Sigma MRR_i(0)},$$

where $MRR_i(t)$ is the resistance measurement for an $i^{th}$ sensor at time t and $\Sigma MRR_i(t)$ is the average resistance of all sensors at time t.

10. The method of claim 9 wherein the at least one other file parameter comprises a measurement of the spindle motor current.

11. The method of claim 4 wherein the predictive failure analysis value is determined according to:

$$PFA_i(t) = \frac{MRR_i(t)}{\Sigma MRR_i(t)} - \frac{MRR_i(0)}{\Sigma MRR_i(0)},$$

where $MRR_i(t)$ is the resistance measurement for an $i^{th}$ sensor at time t and $\Sigma MRR_i(t)$ is the average resistance of all sensors at time t.

12. The method of claim 1 further comprising correlating a detected head/disk interface problem using the resistance measurement for the at least one read sensor with at least one other file parameter to corroborate a detected head/disk interface problem.

13. The method of claim 1 wherein the at least one read sensor is at least one MR sensor.

14. The method of claim 1 wherein the at least one read sensor is at least one GMR sensor.

15. The method of claim 1 wherein the at least one read sensor is at least one special wear sensor.

16. A method for qualitatively and quantitatively measuring a change in the stripe height of a MR head in a disk drive, comprising:
   - burnishing a head/disk interface;
   - obtaining a baseline measurement of resistance at initial conditions for at least one magneto-resistive (MR) sensor of a disk drive having a stripe height;
   - operating the disk drive at normal speed;
   - returning the disk to the initial conditions;
   - obtaining a present measurement of resistance for the at least one magneto-resistive (MR) sensor of a disk drive; and
   - determining a change in stripe height based upon the difference between the baseline measurement of resistance and the present measurement of resistance.

17. The method of claim 16 wherein the change in the stripe height is determined according to:

$$\Delta(StripeHeight)_i = \frac{MRR_i(t) - MRR_i(0)}{MRR_i(0)} \cdot StripeHeight,$$

where $MRR_i(t)$ is the resistance measurement for an $i^{th}$ MR sensor at time t and $MRR_i(0)$ is the baseline average resistance of the all MR sensors.

18. A method for measuring the health of a disk drive, comprising:

obtaining a baseline measurement of resistance for at least one read sensor of a disk drive;

periodically obtaining subsequent measurements of resistance for the at least one read sensor of a disk drive; and processing the subsequent measurements and the baseline measurement to identify a detrimental change to the at least one read sensor.

19. The method of claim 18 wherein the processing further comprises:

comparing a subsequent resistance measurement for the at least one read sensor to the baseline measurement of resistance for the at least one read sensor to detect a head/disk interface problem; and flagging the file for corrective action when the head/disk interface problem is detected.

20. The method of claim 18 wherein the processing further comprises:

determining a change in stripe height based upon the difference between the baseline measurement of resistance and the subsequent measurement of resistance.

21. An apparatus for providing predictive failure analysis for a disk drive, comprising:

at least one read sensor; and a processor for obtaining a baseline measurement of resistance for at least one read sensor of a disk drive, obtaining a present resistance measurement for the at least one read sensor; comparing the present resistance measurement for the at least one read sensor to the baseline measurement of resistance for the at least one read sensor to detect a head/disk interface problem and flagging the file for corrective action when the head/disk interface problem is detected.

22. The apparatus of claim 21 wherein the processor is the servo controller.

23. The apparatus of claim 21 wherein the processor obtains and compares until a head/disk interface problem is detected.

24. The apparatus of claim 21 wherein the processor takes no action except to continue to obtain additional present measurements of the resistance for the at least one read sensor when a head/disk interface problem is not detected.

25. The apparatus of claim 21 wherein the processor determines a predictive failure analysis value based upon a difference between the present resistance measurement for the at least one sensor to the baseline measurement of resistance for the at least one sensor, compares the predictive failure analysis value to a pre-selected threshold and detects a head/disk interface problem when the predictive failure analysis exceeds the pre-selected threshold.

26. The apparatus of claim 25 wherein the predictive failure analysis value is determined according to:

$$PFA_i(t) = \frac{MRR_i(t)}{\sum MRR_i(t)} - \frac{MRR_i(0)}{\sum MRR_i(0)},$$

where $MRR_i(t)$ is the resistance measurement for an $i^{th}$ sensor at time t and $\Sigma MRR_i(t)$ is the average resistance of all sensors at time t.

27. The apparatus of claim 21 wherein the processor correlates a detected head/disk interface problem using the resistance measurement for the at least one read sensor with at least one other file parameter to corroborate a detected head/disk interface problem.

28. The apparatus of claim 27 wherein the at least one other file parameter comprises a measurement of the spindle motor current.

29. The apparatus of claim 21 wherein the at least one read sensor is at least one MR sensor.

30. The apparatus of claim 21 wherein the at least one read sensor is at least one GMR sensor.

31. The apparatus of claim 21 wherein the at least one read sensor is at least one special wear sensor.

32. An apparatus for providing predictive failure analysis for a disk drive, comprising:

at least one read sensor; and a processor for burnishing a head/disk interface, obtaining a baseline measurement of resistance at initial conditions for at least one read sensor of a disk drive having a stripe height, operating the disk drive at normal speed, returning the disk to the initial conditions, obtaining a present measurement of resistance for the at least one read sensor of a disk drive and determining a change in stripe height based upon the difference between the baseline measurement of resistance and the present measurement of resistance.

33. The apparatus of claim 32 wherein the processor determines the change in the stripe height according to:

$$\Delta(StripeHeight)_i = \frac{MRR_i(t) - MRR_i(0)}{MRR_i(0)} \cdot StripeHeight,$$

where $MRR_i(t)$ is the resistance measurement for an $i^{th}$ sensor at time t and $MRR_i(0)$ is the baseline average resistance of all sensors.

34. An apparatus for providing predictive failure analysis for a disk drive, comprising:

at least one read sensor; and a processor for obtaining a baseline measurement of resistance for at least one read sensor of a disk drive, periodically obtaining subsequent measurements of resistance for the at least one read sensor of a disk drive; and processing the subsequent measurements and the baseline measurement to identify a detrimental change to the at least one read sensor.

35. The apparatus of claim 34 wherein the processor compares a subsequent resistance measurement for the at least one read sensor to the baseline measurement of resistance for the at least one read sensor to detect a head/disk interface problem and flags the file for corrective action when the head/disk interface problem is detected.

36. The apparatus of claim 34 wherein the processor determines a change in stripe height based upon the difference between the baseline measurement of resistance and the subsequent measurement of resistance.

37. A disk drive, comprising:

a spindle having at least one attached disk for recording data thereon;

a spindle motor, coupled to the spindle, for rotating the spindle and the at least one disk;

a spindle driver, coupled to the spindle motor, for providing the motor current to the spindle motor;

an actuator assembly having at least one arm, the at least one arm having at least one read sensor disposed at a distal end thereof;

a voice coil motor, coupled to the actuator assembly, for positioning the at least one arm having the at least one read sensor relative to the at least one disk; and a controller, coupled to the voice coil motor and spindle driver, for controlling the voice coil motor, the spindle driver and providing predictive failure analysis for a disk drive, the controller further comprising a processor for obtaining a baseline measurement of resistance for the at least one read sensor of the disk drive, periodically obtaining subsequent measurements of resistance for the at least one read sensor of the disk drive; and processing the subsequent measurements and the baseline measurement to identify a detrimental change to the at least one read sensor.

38. The disk drive of claim 37 wherein the controller compares a subsequent resistance measurement for the at least one read sensor to the baseline measurement of resistance for the at least one read sensor to detect a head/disk interface problem and flags the file for corrective action when the head/disk interface problem is detected.

39. The disk drive of claim 37 wherein the controller determines a change in stripe height based upon the difference between the baseline measurement of resistance and the subsequent measurement of resistance.

40. An article of manufacture comprising a program storage medium readable by a computer, the medium tangibly embodying one or more programs of instructions executable by the computer to perform a method for providing predictive failure analysis using a resistance of a sensor, the method comprising:

obtaining a baseline measurement of resistance for at least one read sensor of a disk drive;

periodically obtaining subsequent measurements of resistance for the at least one read sensor of a disk drive; and processing the subsequent measurements and the baseline measurement to identify a detrimental change to the at least one read sensor.

41. The article of manufacture of claim 40 wherein the processing further comprises:

comparing a subsequent resistance measurement for the at least one read sensor to the baseline measurement of resistance for the at least one read sensor to detect a head/disk interface problem; and flagging the file for corrective action when the head/disk interface problem is detected.

42. The article of manufacture of claim 41 wherein the comparing further comprises:

determining a predictive failure analysis value based upon a difference between the present resistance measurement for the at least one read sensor to the baseline measurement of resistance for the at least one read sensor;

comparing the predictive failure analysis value to a preselected threshold; and detecting a head/disk interface problem when the predictive failure analysis exceeds the pre-selected threshold.

43. The article of manufacture of claim 42 wherein the predictive failure analysis value is determined according to:

$$PFA_i(t) = \frac{MRR_i(t)}{\sum MRR_i(t)} - \frac{MRR_i(0)}{\sum MRR_i(0)},$$

where $MRR_i(t)$ is the resistance measurement for an $i^{th}$ sensor at time t and $\Sigma MRR_i(t)$ is the average resistance of all sensors at time t.

44. The article of manufacture of claim 40 wherein the processing further comprises:

determining a change in stripe height based upon the difference between the baseline measurement of resistance and the subsequent measurement of resistance.

45. The article of manufacture of claim 44 wherein the change in the stripe height is determined according to:

$$\Delta(StripeHeight)_i = \frac{MRR_i(t) - MRR_i(0)}{MRR_i(0)} \cdot StripeHeight,$$

where $MRR_i(t)$ is the resistance measurement for an $i^{th}$ sensor at time t and $MRR_i(0)$ is the baseline average resistance of all sensors.

* * * * *